(12) United States Patent
Stoev et al.

(10) Patent No.: US 9,563,397 B1
(45) Date of Patent: Feb. 7, 2017

(54) DISK DRIVE USING NON-VOLATILE CACHE WHEN GARBAGE COLLECTING LOG STRUCTURED WRITES

(75) Inventors: Kroum S. Stoev, Pleasanton, CA (US); Davide Guarisco, San Jose, CA (US); Eric J. Champion, San Jose, CA (US); William C. Cain, Foothill Ranch, CA (US)

(73) Assignee: WESTERN DIGITAL TECHNOLOGIES, INC., Lake Forest, CA (US)

( * ) Notice: Subject to any disclaimer, the term of this patent is extended or adjusted under 35 U.S.C. 154(b) by 1524 days.

(21) Appl. No.: 12/774,643

(22) Filed: May 5, 2010

(51) Int. Cl.
| G06F 12/00 | (2006.01) |
| G06F 21/00 | (2013.01) |
| G06F 13/00 | (2006.01) |
| G06F 5/06 | (2006.01) |
| G06F 5/10 | (2006.01) |

(52) U.S. Cl.
CPC ............... *G06F 5/065* (2013.01); *G06F 5/10* (2013.01)

(58) Field of Classification Search
None
See application file for complete search history.

(56) References Cited

U.S. PATENT DOCUMENTS

| 4,901,169 A | 2/1990 | Hamaoka et al. |
| 5,586,291 A | 12/1996 | Lasker et al. |
| 5,777,813 A | 7/1998 | Sun et al. |
| 5,799,324 A | 8/1998 | McNutt et al. |
| 5,930,815 A * | 7/1999 | Estakhri et al. ............... 711/103 |
| 6,185,063 B1 | 2/2001 | Cameron |
| 6,204,983 B1 | 3/2001 | Ito |
| 6,516,426 B1 | 2/2003 | Forehand et al. |
| 6,967,810 B2 | 11/2005 | Kasiraj et al. |
| 7,076,604 B1 | 7/2006 | Thelin |
| 7,082,007 B2 | 7/2006 | Liu et al. |
| 7,461,202 B2 | 12/2008 | Forrer, Jr. et al. |
| 7,472,222 B2 | 12/2008 | Auerbach et al. |
| 7,486,460 B2 | 2/2009 | Tsuchinaga et al. |
| 7,490,212 B2 | 2/2009 | Kasiraj et al. |
| 7,509,471 B2 | 3/2009 | Gorobets |
| 2005/0069298 A1 | 3/2005 | Kasiraj et al. |
| 2005/0071537 A1 | 3/2005 | New et al. |
| 2005/0177687 A1* | 8/2005 | Rao ............................ 711/118 |
| 2006/0143407 A1* | 6/2006 | Humlicek .................... 711/143 |

(Continued)

FOREIGN PATENT DOCUMENTS

GB 2403834 A * 1/2005 ............. G06F 12/08

OTHER PUBLICATIONS http://www.ibm.com/developerworks/aix/library/au-buffer/ "Logging in multi-threaded applications efficiently with ring buffer" Manish Katiyar, Devendra Jadhav Aug. 14, 2007.*

(Continued)

*Primary Examiner* — Michael Alsip

(57) ABSTRACT

A disk drive is disclosed comprising a head actuated over a disk comprising a plurality of tracks, each track comprising a plurality of data sectors. A circular buffer is defined comprising a plurality of the tracks. During a garbage collection operation, write data is read from previously written valid data sectors corresponding to a tail of the circular buffer and stored in a non-volatile cache. During a flush operation, the write data is flushed from the non-volatile cache to the disk.

30 Claims, 9 Drawing Sheets

(56) References Cited

U.S. PATENT DOCUMENTS

| | | |
|---|---|---|
| 2006/0232874 A1 | 10/2006 | Tsuchinaga et al. |
| 2007/0162693 A1 | 7/2007 | Nam |
| 2007/0223132 A1 | 9/2007 | Tsuchinaga |
| 2008/0059694 A1 | 3/2008 | Lee |
| 2008/0256287 A1 | 10/2008 | Lee et al. |
| 2008/0307160 A1* | 12/2008 | Humlicek ............ 711/113 |
| 2009/0019218 A1 | 1/2009 | Sinclair et al. |
| 2009/0089508 A1* | 4/2009 | Trika et al. ............ 711/135 |
| 2009/0150599 A1 | 6/2009 | Bennett |
| 2009/0271562 A1 | 10/2009 | Sinclair |
| 2010/0070729 A1* | 3/2010 | Ng et al. ............ 711/166 |

OTHER PUBLICATIONS http://www.blackwasp.co.uk/CircularBuffer.aspx "A Generic Circular Buffer" Richard Carr Nov. 7, 2011.*

* cited by examiner

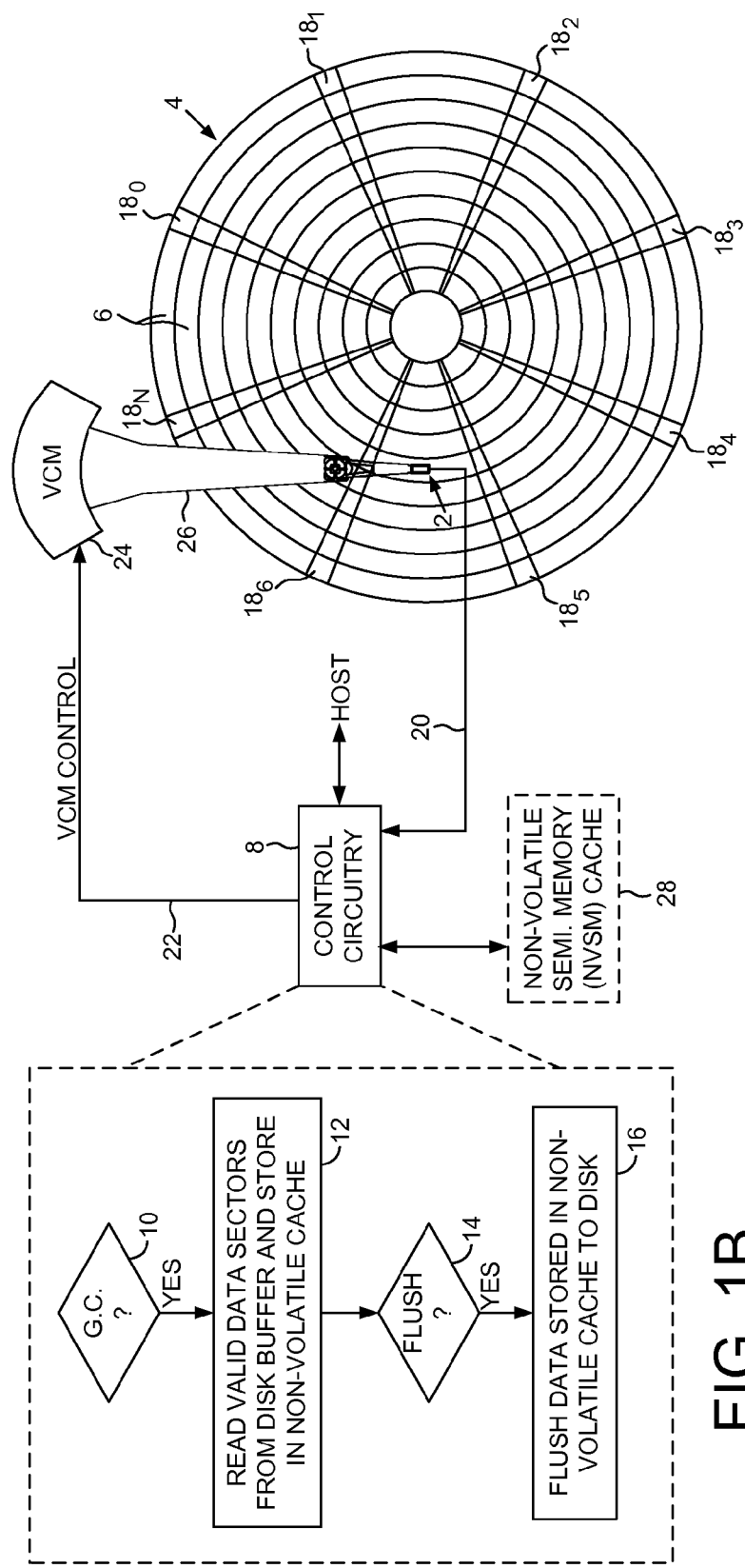

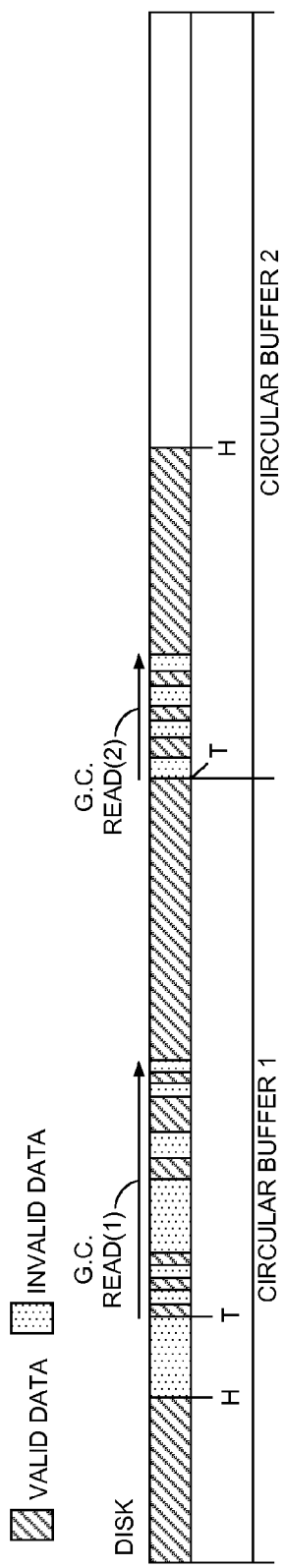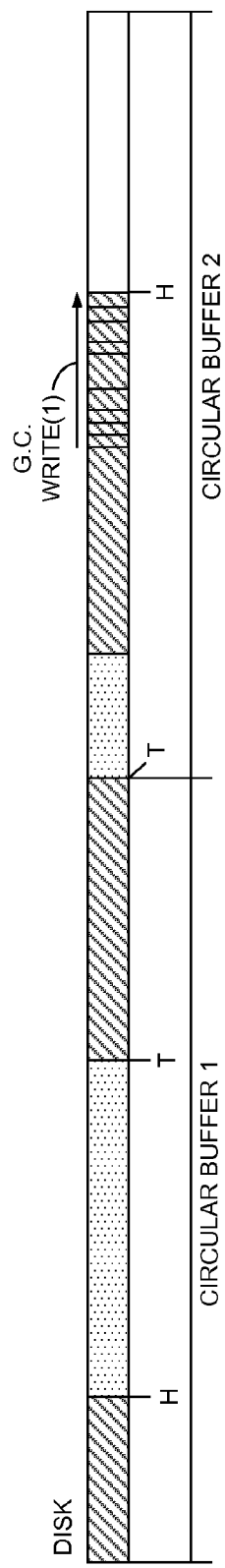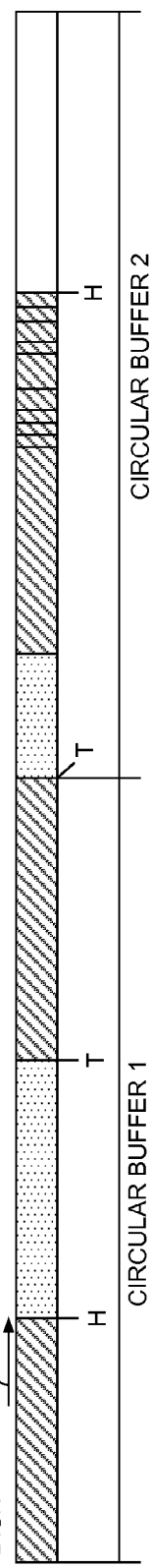

DISK DRIVE USING NON-VOLATILE CACHE WHEN GARBAGE COLLECTING LOG STRUCTURED WRITES

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

The data sectors are accessed indirectly using logical block addresses (LBAs) mapped to physical block addresses (PBAs) representing the physical location of each data sector. This indirect accessing facilitates mapping out defective data sectors during manufacturing as well as while the disk drive is deployed in the field. Access commands (read/write) received from the host include LBAs which the disk drive maps to corresponding PBAs using any suitable mapping technique.

The LBA to PBA mapping may also facilitate log structured writes wherein at least part of the disk is written as a circular buffer. For example, the circular buffer may be written from an outer diameter track toward an inner diameter track, and then circle back to the outer diameter track. Data is written to the head of the circular buffer such that the LBAs of new write commands are mapped to the PBAs of the corresponding data sectors. When the same LBA is written by the host, the data is written to a new PBA at the head of the circular buffer and the old PBA is marked invalid so that it may be overwritten. During a garbage collection operation, valid PBAs previously written in the circular buffer may be relocated to the head of the circular buffer so that the old PBAs may be overwritten.

BRIEF DESCRIPTION OF THE DRAWINGS

FIG. 1A shows a disk drive according to an embodiment of the present invention comprising a head actuated over a disk including a plurality of tracks, wherein a circular buffer is defined comprising a plurality of the tracks.

FIG. 1B is a flow diagram according to an embodiment of the present invention wherein during a garbage collection operation write data read from previously written data sectors at the tail of the circular buffer is stored in a non-volatile cache and then flushed to the disk.

FIGS. 3A-3C illustrate an embodiment of the present invention wherein the valid data read during the garbage collection operation is written to a second circular buffer, whereas write data received from a host is written to a first circular buffer.

DETAILED DESCRIPTION OF EMBODIMENTS OF THE INVENTION

Figure 2A:
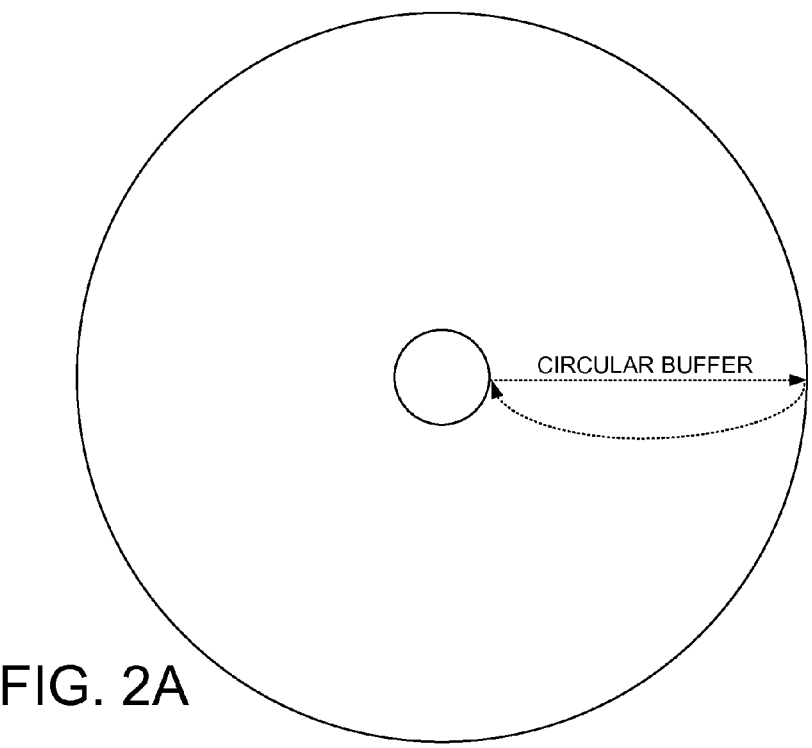
FIG. 2A shows an embodiment of the present invention wherein the circular buffer spans a radius of the disk from the inner diameter to the outer diameter.

FIG. 1A shows a disk drive according to an embodiment of the present invention comprising a head 2 actuated over a disk 4, the disk 4 including a circular buffer comprising a plurality of tracks 6. The disk drive further comprises control circuitry 8 for executing the flow diagram of FIG. 1B wherein during a garbage collection operation (step 10) write data is read from previously written valid data sectors corresponding to a tail of the circular buffer and stored in a non-volatile cache (step 12). During a flush operation (step 14) the write data is flushed from the non-volatile cache to the disk (step 16).

In the disk drive of FIG. 1A, a plurality of embedded servo sectors $18_0$-$18_N$ are recorded on the disk 4 to define the plurality of tracks 6, wherein each servo sector comprises suitable position information, such as a track address providing coarse position information and servo bursts providing fine position information. As the head 2 passes over a servo sector, the control circuitry 8 demodulates a read signal 20 emanating from the head into a position error signal (PES). The PES is filtered by a suitable compensation filter to generate a control signal 22 applied to a voice coil motor (VCM) 24. The VCM 24 rotates an actuator arm 26 about a pivot in order to position the head 2 radially over the disk 4 in a direction that reduces the PES.

In one embodiment, the non-volatile cache comprises a non-volatile semiconductor memory (NVSM) cache 28 (FIG. 1A). The NVSM cache 28 may comprise any suitable type of memory, such as a flash memory comprising a plurality of blocks, wherein each block comprises a plurality of pages, and each page may store one or more data sectors.

As described in greater detail below, in one embodiment the NVSM cache enables the control circuitry 8 to service host write commands (and cache hit read commands) without interrupting the garbage collection operation on the circular buffer, as well as provides non-volatile storage of host data and garbage collected data in the event of a power failure.

FIG. 2A shows an embodiment of the present invention wherein the circular buffer spans substantially the entire disk, and data is written from an inner diameter (ID) of the disk toward an outer diameter (OD) of the disk. Accordingly, the circular buffer comprises a head for writing new data and a tail that identifies invalid data that was previously "overwritten". In one embodiment, the tracks are written in a shingled manner such that a previously written track is partially overwritten. Writing data in one direction (always at the head of the circular buffer) ensures that a previously written track is partially overwritten only on one side. Other embodiments may implement a circular buffer on the disk without shingled writing. The technique of writing data to a disk in a circular buffer is generally referred to as a log structured write regardless as to whether shingled writing is employed.

Figure 2B:
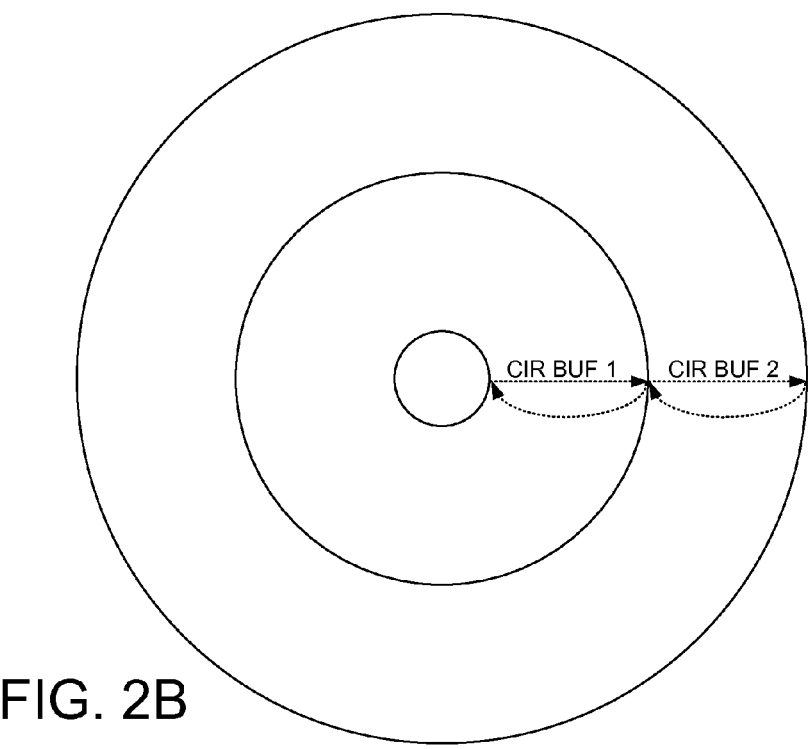
FIG. 2B shows an embodiment of the present invention wherein first and second circular buffers are defined on the disk.
Figure 2C:
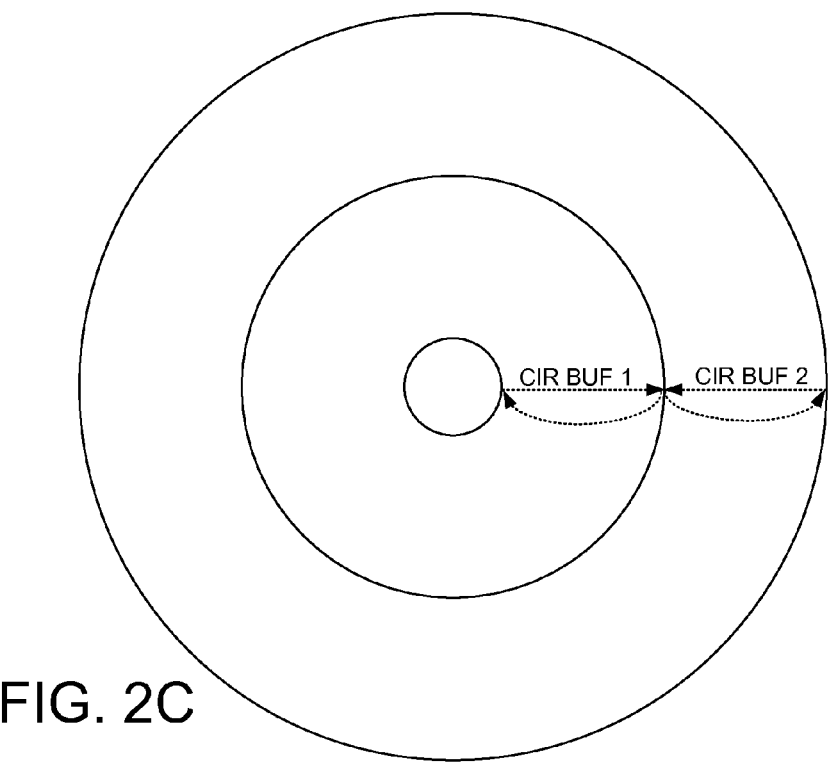
FIG. 2C shows an embodiment of the present invention wherein the first and second circular buffers are written toward a middle diameter of the disk.
Figure 2D:
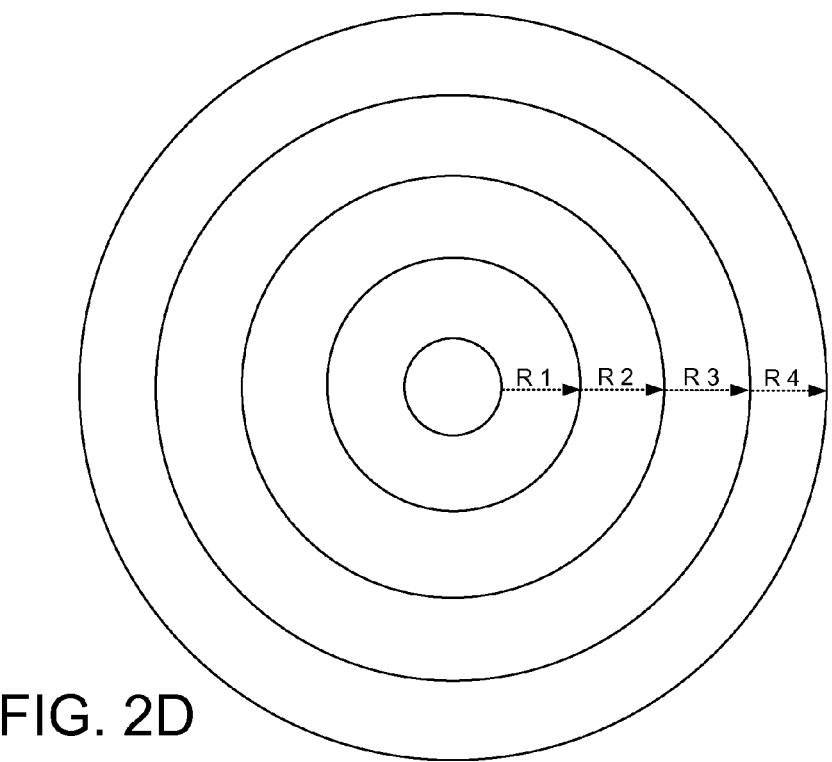
FIG. 2D shows an embodiment of the present invention wherein a number of circular buffers are defined on the disk each corresponding to different LBA ranges.

FIG. 2B shows an embodiment of the present invention wherein the control circuitry defines two circular buffers on the disk which may be selected to service write commands received from the host as well as garbage collection writes using any suitable algorithm. In the embodiment of FIG. 2B, the first and second circular buffers are written from the ID toward the OD. In an alternative embodiment shown in FIG. 2C, a first circular buffer is written from the ID to the middle diameter (MD), and a second circular buffer is written from the OD to the MD which may help overcome drawbacks associated with the skew angle of the head. FIG. 2D shows an embodiment of the present invention wherein the control circuitry defines a number of circular buffers on the disk (four in the example shown). In embodiment described in greater detail below, each circular buffer may be assigned a target LBA range for servicing write commands which may help reduce fragmentation in each circular buffer as well as reduce seek latency when accessing contiguous LBAs (such as when reading a file).

FIGS. 3A-3C illustrate an embodiment of the present invention wherein at least two circular buffers are defined on the disk, and as shown in FIG. 3A, each circular buffer may contain invalid data and valid data corresponding to the tail of the circular buffer. During a garbage collection operation, the head may be positioned at the tail of the first circular buffer to read the valid data sectors disbursed with the invalid data sectors, and then positioned at the tail of the second circular buffer to read the valid data sectors disbursed with the invalid data sectors. In one embodiment, the valid data read from the circular buffers is stored in a NVSM cache 28 (FIG. 1A). The head is then positioned at the head of the second circular buffer and the valid data is written as shown in FIG. 3B, thereby freeing the data sectors at the tail of the circular buffers.

In one embodiment, if a write command is received from a host while reading and relocating the valid data of the circular buffers during the garbage collection, the write data received from the host is stored in the NVSM cache 28. After completing the garbage collection operation, the head is positioned at the head of the first circular buffer and the host write data is written as illustrated in FIG. 3C. Accordingly, the NVSM cache 28 enables host write commands (and cache hit read commands) to be serviced without interrupting the garbage collection of the disk circular buffers.

Figure 4:
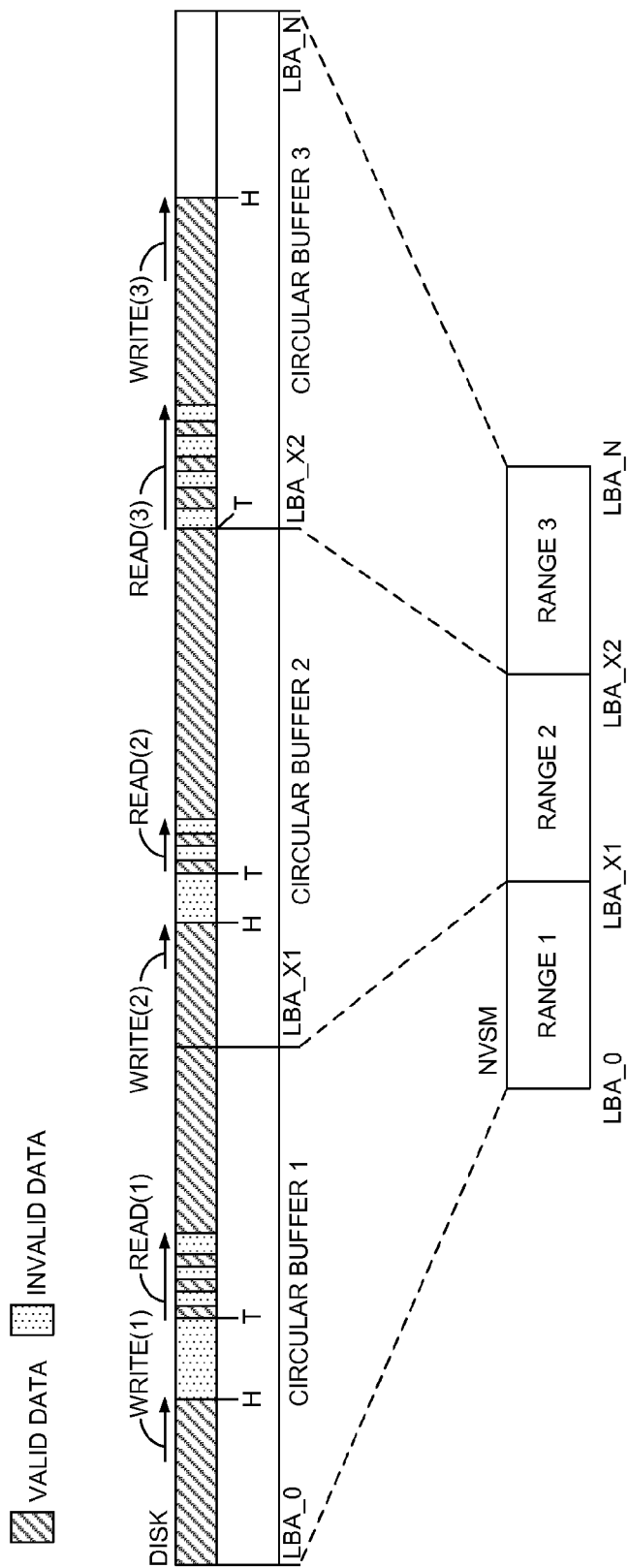
FIG. 4 shows an embodiment of the present invention wherein the non-volatile cache comprises a non-volatile semiconductor memory (NVSM) cache comprising a plurality of LBA ranges corresponding to the LBA ranges of circular buffers on the disk.

FIG. 4 shows an embodiment of the present invention wherein three circular buffers are defined on the disk, and each circular buffer is assigned an LBA range. Data is then stored in the circular buffers based on the LBA range of the write data, including write data received from the host as well as valid data read from the circular buffer during garbage collection. In one embodiment, corresponding LBA ranges are defined in the NVSM cache 28 for storing write data received from the host as well as the valid data read from the circular buffers during garbage collection. Storing data in the circular buffers based on the LBAs of the data reduces fragmentation of the circular buffers as well as reduce seek latency when accessing contiguous LBAs (such as when reading a file).

Figure 5A:
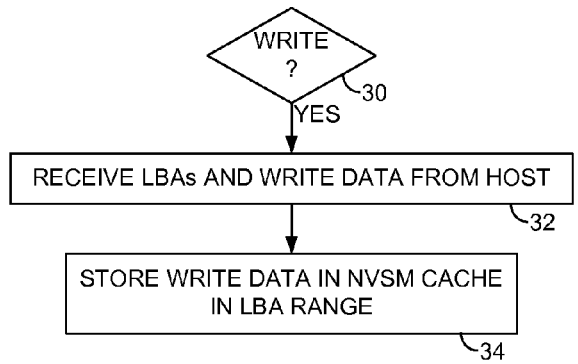
FIG. 5A is a flow diagram according to an embodiment of the present invention wherein write data received from the host in a write command is stored in the NVSM cache based on LBA range before being flushed to the disk.

FIG. 5A is a flow diagram according to an embodiment of the present invention, wherein when a write command is received from the host (step 30), the LBAs and corresponding write data are received from the host (step 32). The write data is then stored in the ranges defined in the NVSM cache based on the LBA range of the write data (step 34). Accordingly, in this embodiment the NVSM cache operates as a write through cache which facilitates uninterrupted garbage collection of the circular buffers on the disk while providing non-volatile storage in the event of a power failure. In addition, storing write data received with host write commands as well as the valid data read from the circular buffers during garbage collection based on the LBAs helps reduce write amplification when garbage collecting the NVSM cache because it increases the probability that an entire block of pages can be erased without relocating valid pages.

Figure 5B:
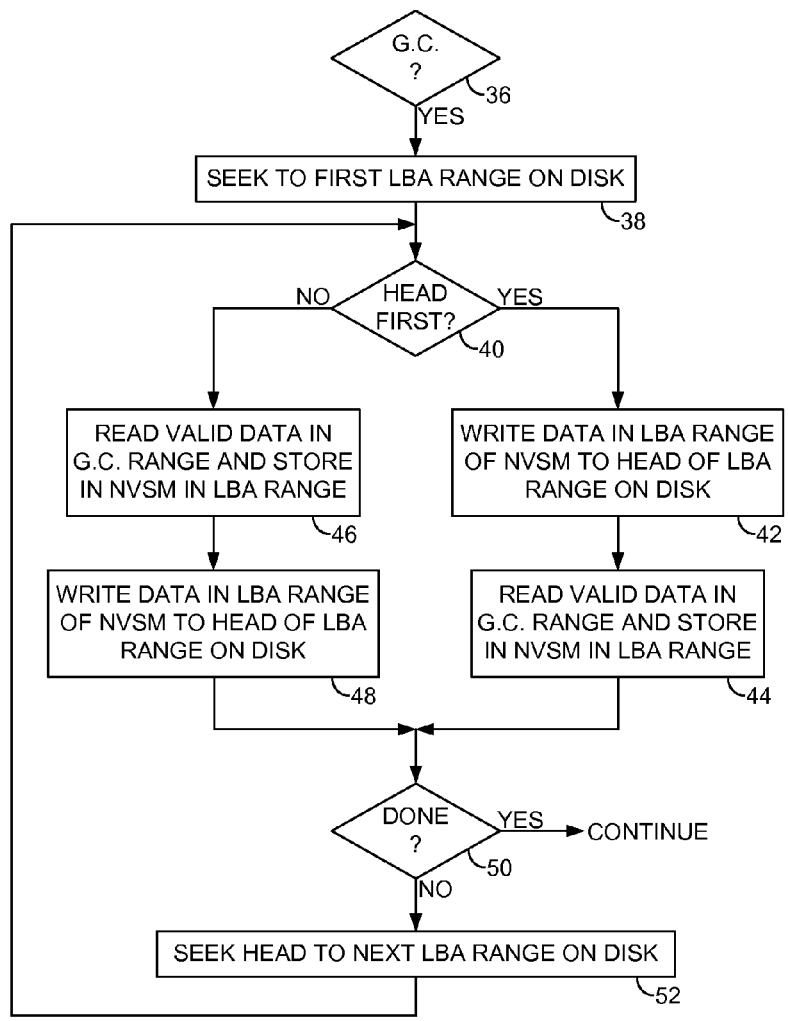
FIG. 5B is a flow diagram according to an embodiment of the present invention wherein the valid data read from the tail of the circular buffers is read into the NVSM cache and flushed from the NVSM cache to the head of the circular buffers.

FIG. 5B is a flow diagram according to an embodiment of the present invention which is understood with reference to FIG. 4. When a garbage collection operation is initiated (step 36) the control circuitry seeks the head to the first circular buffer corresponding to the first LBA range (step 38). If the head is in front of the head of the circular buffer (step 40) as illustrated in the example of FIG. 4, then data stored in the corresponding LBA range of the NVSM cache is written to the head of the circular buffer (step 42). The control circuitry then seeks the head to the tail of the circular buffer, reads the valid data in the garbage collection range, and stores the valid data in the corresponding LBA range of the NVSM cache (step 44). This process is repeated (step 50) by seeking the head to the second circular buffer (step 52), and then to the third circular buffer shown in FIG. 4. When processing the third circular buffer, the tail is encountered first (step 40) such that the valid data in the garbage collection range is read first and stored in the LBA range of the NVSM cache (step 46). When the head reaches the head of the circular buffer, the garbage collected data and other write data received from the host in the corresponding LBA range is read from the NVSM cache and written to the head of the circular buffer (step 48).

Figure 6A:
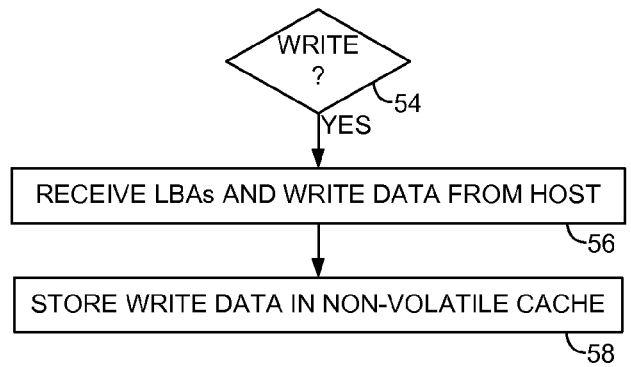
FIG. 6A is a flow diagram according to an embodiment of the present invention wherein write data received from the host in a write command is stored in the non-volatile cache before being flushed to the disk.
Figure 6B:
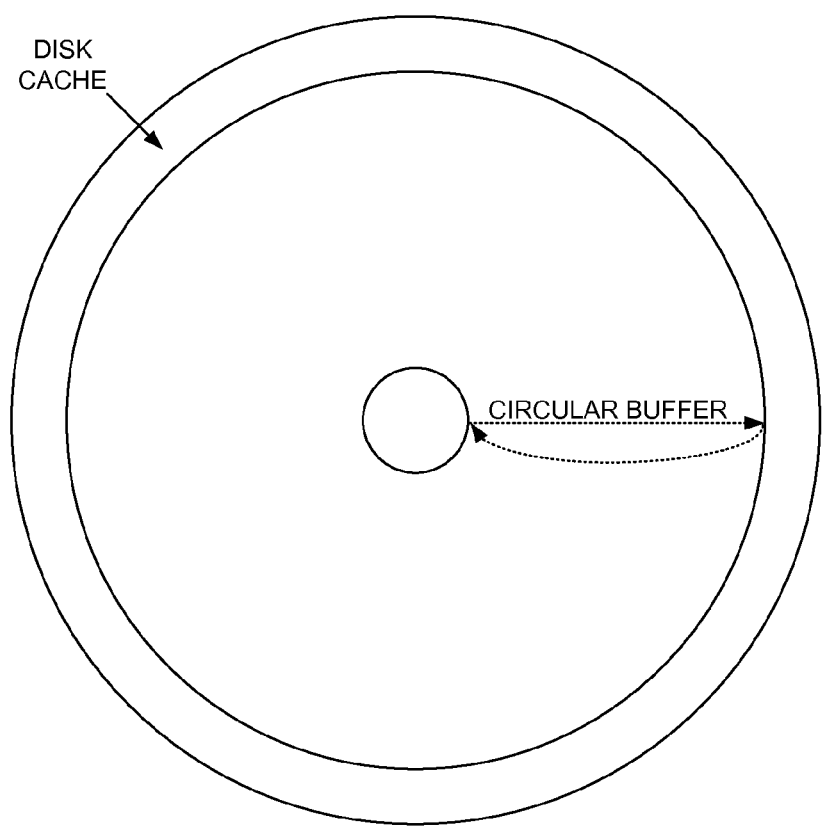
FIG. 6B shows an embodiment of the present invention wherein the non-volatile cache comprises a disk cache comprising a plurality of the tracks.
Figure 6C:
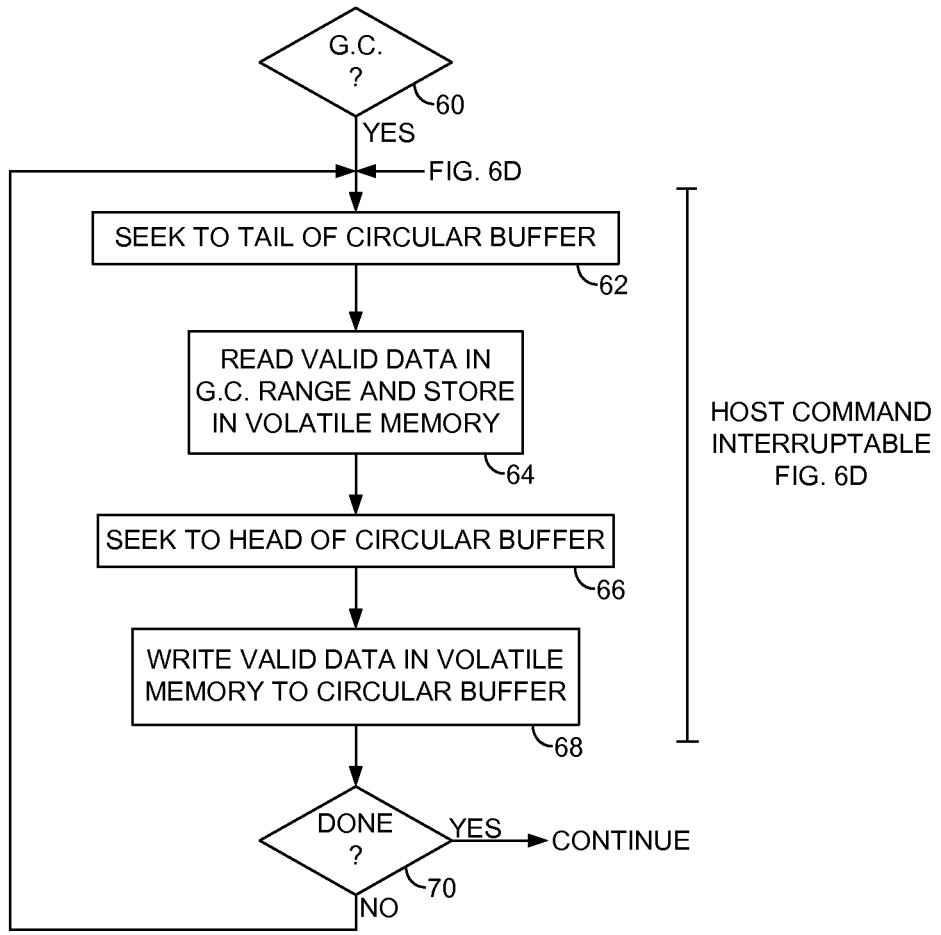
FIG. 6C is a flow diagram according to an embodiment of the present invention wherein when garbage collecting the circular buffer the valid data is stored in a volatile semiconductor memory and then written to the head of the circular buffer.

FIG. 6A is a flow diagram according to an embodiment of the present invention wherein when a write command is received (step 54) the write data and corresponding LBAs are received from the host (step 56). The write data is stored in the non-volatile cache (step 58) before being written to a circular buffer on the disk. In this embodiment, the non-volatile cache may comprise any suitable memory, such as the NVSM cache 28 of FIG. 1A or a disk cache as illustrated in FIG. 6B. The disk cache in FIG. 6B comprises a plurality of consecutive tracks, and in one embodiment the disk cache is accessed as a circular buffer to facilitate dynamic LBA mapping. The disk cache may be located at any suitable location on the disk, such as at an outer diameter of the disk as shown in the example of FIG. 6C, or at an inner diameter of the disk, or at a middle diameter of the disk between first and second circular buffers (FIG. 2C). Other embodiments may employ multiple disk caches at different radial locations on the disk to reduce the seek distance relative to the radial location of the head.

FIG. 6C is a flow diagram according to an embodiment of the present invention wherein when a garbage collection operation is initiated (step 60), the control circuitry seeks the head to the tail of the circular buffer of FIG. 6B (step 62). The valid data in the garbage collection range is read (step 64) and stored in a volatile memory (e.g., a RAM). When the volatile memory is full, the control circuitry seeks the head to the head of the circular buffer (step 66) and writes the valid data stored in the volatile memory to the head of the circular buffer (step 68). This process is repeated until all of the valid data has been relocated to the head of the circular buffer. If a host command is received during this garbage collection operation, the flow diagram of FIG. 6C is interrupted and the flow diagram of FIG. 6D is executed.

Figure 6D:
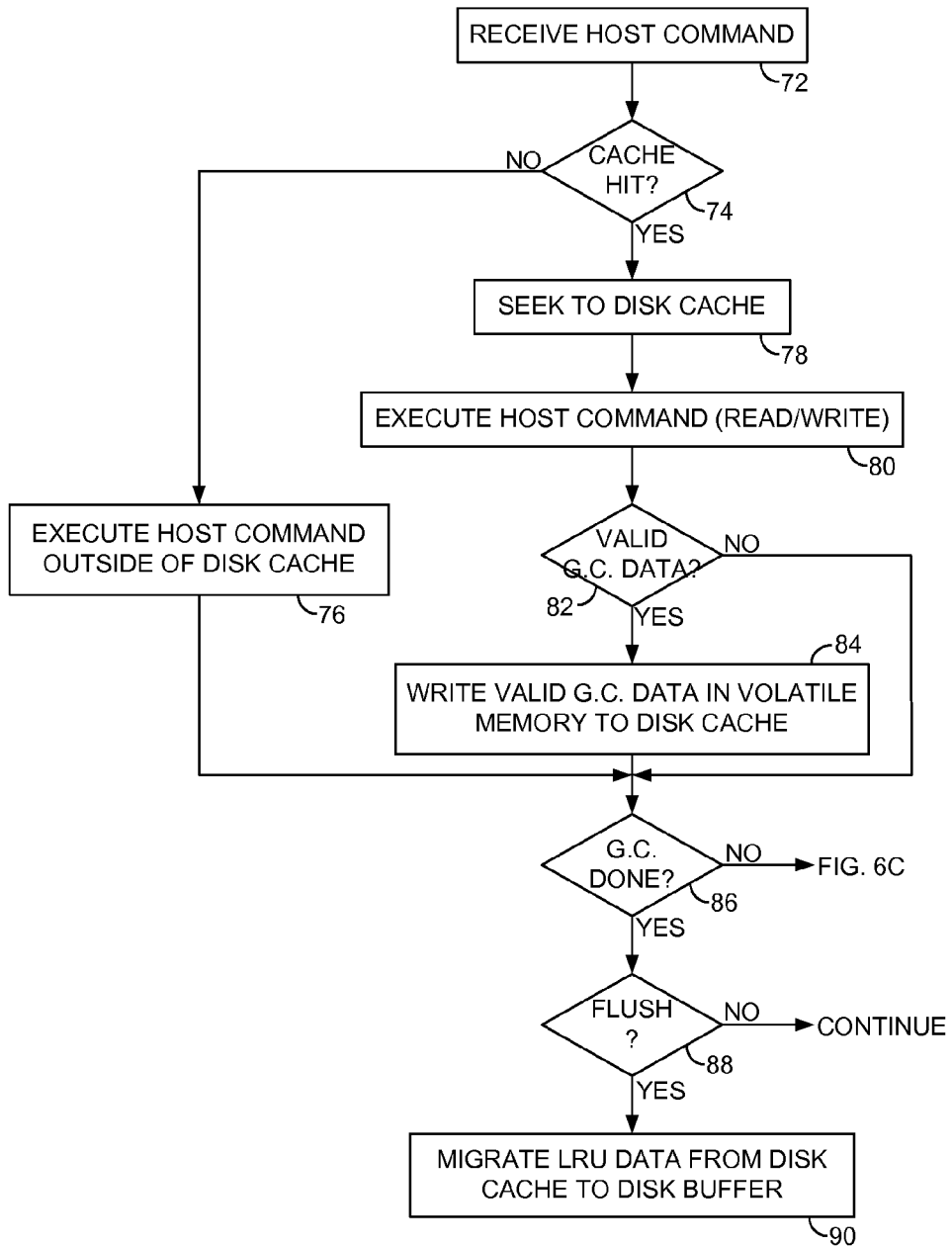
FIG. 6D is a flow diagram according to an embodiment of the present invention wherein when a write command is received from the host while garbage collecting the circular buffer, the garbage collection is interrupted and the write data received from the host as well as the valid data in the volatile semiconductor memory is stored in the disk cache before being flushed to the head of the circular buffer.

Referring to the flow diagram of FIG. 6D, when a host command is received (step 72) and the host command is a read command it is evaluated to determine whether it can be serviced from the disk cache of FIG. 6B (step 74). If not, then the read command is executed by seeking to the corresponding location within the circular buffer (step 76), and the garbage collection operation resumes (step 86). If the host command is a write command, or a read command with a cache hit, then the control circuitry seeks the head to the disk cache (step 78) and executes the host command by accessing the disk cache (step 80). If there is valid data stored in the volatile memory from the garbage collection operation (step 82), the valid data is also written to the disk cache (step 84). The garbage collection operation then resumes (step 86) by seeking the head back to the tail of the circular buffer.

In one embodiment, when the capacity of the disk cache falls below a threshold, a flush operation is initiated (step 88). The flush operation may migrate data stored in the disk cache to the head of the circular buffer based on any suitable algorithm, such as by flushing the least recently used (LRU) data (step 90).

The disk cache facilitates the garbage collection operation by flushing the valid data from the volatile memory while servicing host commands, thereby avoiding the need to seek to the head of the circular buffer (step 66 of FIG. 6C). The disk cache also provides non-volatile storage in the event of a power failure as well as frees space in the volatile memory so that the garbage collection operation can continue. During idle periods (when host commands are not being serviced), the control circuitry can seek the head to the head of the circular buffer in order to flush the disk cache.

Although the embodiment of FIG. 6B shows a single circular buffer in combination with a disk cache, the disk cache may be used in other embodiments in combination with multiple circular buffers as described above. In other embodiments, the disk cache itself may comprise multiple circular buffers for implementing one or more of the above techniques, such as storing data based on LBA ranges within the disk cache. In yet another embodiment, the disk drive may comprise a NVSM cache as well as a disk cache, and implement one or more of the above described embodiments for implementing garbage collection of circular buffers on the disk.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of tracks, each track comprising a plurality of data sectors;
   a head actuated over the disk; and
   control circuitry operable to:
      define a first circular buffer comprising at least two of the tracks;
      overwrite a logical block address (LBA) mapped to a first data sector corresponding to a tail of the first circular buffer by writing data to a second data sector at a head of the first circular buffer and remapping the LBA to the second data sector, thereby invalidating the first data sector;
      read first write data from previously written valid data sectors corresponding to the tail of the first circular buffer;
      store the first write data in a non-volatile cache; and
      flush the first write data from the non-volatile cache to the disk.

2. The disk drive as recited in claim 1, wherein the non-volatile cache comprises a non-volatile semiconductor memory (NVSM) cache.

3. The disk drive as recited in claim 2, wherein the control circuitry is further operable to:
   receive a first write command from a host comprising second write data;
   store the second write data in the NVSM cache; and
   flush the second write data from the NVSM cache to the disk.

4. The disk drive as recited in claim 3, wherein the control circuitry is further operable to flush the first and second write data from the NVSM cache to data sectors at the head of the first circular buffer.

5. The disk drive as recited in claim 3, wherein the control circuitry is further operable to:
   receive a second write command from the host comprising third write data; and
   store the third write data in the NVSM cache while reading the first write data from the valid data sectors.

6. The disk drive as recited in claim 5, wherein the control circuitry is further operable to flush the third write data together with the first and second write data to the data sectors at the head of the first circular buffer.

7. The disk drive as recited in claim 3, wherein logical block addresses (LBAs) are associated with the first and second write data, and the control circuitry is further operable to flush the first and second write data from the NVSM cache in an order based on the LBAs.

8. The disk drive as recited in claim 7, wherein the control circuitry is further operable to flush the first and second write data from the NVSM cache in a sequential order based on the LBAs.

9. The disk drive as recited in claim 3, wherein the control circuitry is further operable to:
 define a second circular buffer comprising a plurality of the tracks; and
 flush the first write data from the NVSM cache to the first circular buffer and flush the second write data from the NVSM cache to the second circular buffer.

10. The disk drive as recited in claim 3, wherein logical block addresses (LBAs) are associated with the first and second write data, and the control circuitry is further operable to:
 define a second circular buffer comprising a plurality of the tracks; and
 flush the first and second write data from the NVSM cache to the first circular buffer and to the second circular buffer based on the LBAs.

11. The disk drive as recited in claim 10, wherein the control circuitry is further operable to:
 assign a first LBA range to the first circular buffer and assign a second LBA range to the second circular buffer; and
 flush the first and second write data from the NVSM cache to the first circular buffer and to the second circular buffer based on the LBAs of the write data and the corresponding LBA ranges of the circular buffers.

12. The disk drive as recited in claim 11, wherein the control circuitry is further operable to:
 assign a third LBA range in the NVSM and a fourth LBA range in the NVSM cache; and
 store the first write data and the second write data in the NVSM cache based on the LBAs of the write data and the corresponding LBA ranges of the NVSM cache.

13. The disk drive as recited in claim 12, wherein the first LBA range equals the third LBA range and the second LBA range equals the fourth LBA range.

14. The disk drive as recited in claim 1, wherein the non-volatile cache comprises a disk cache comprising a plurality of the tracks on the disk.

15. The disk drive as recited in claim 14, wherein the control circuitry is further operable to:
 interrupt the reading of the first write data from the previously written valid data sectors in response to a write command received from a host;
 seek the head to the disk cache; and
 store the first write data and second write data received from the host in the disk cache.

16. A method of operating a disk drive comprising a head actuated over a disk including a plurality of tracks, each track comprising a plurality of data sectors, the method comprising:
 defining a first circular buffer comprising at least two of the tracks;
 overwriting a logical block address (LBA) mapped to a first data sector corresponding to a tail of the first circular buffer by writing data to a second data sector at a head of the first circular buffer and remapping the LBA to the second data sector, thereby invalidating the first data sector;
 reading first write data from previously written valid data sectors corresponding to the tail of the first circular buffer;
 storing the first write data in a non-volatile cache; and
 flushing the first write data from the non-volatile cache to the disk.

17. The method as recited in claim 16, wherein the non-volatile cache comprises a non-volatile semiconductor memory (NVSM) cache.

18. The method as recited in claim 17, further comprising:
 receiving a first write command from a host comprising second write data;
 storing the second write data in the NVSM cache; and
 flushing the second write data from the NVSM cache to the disk.

19. The method as recited in claim 18, further comprising flushing the first and second write data from the NVSM cache to data sectors at the head of the first circular buffer.

20. The method as recited in claim 18, further comprising:
 receiving a second write command from the host comprising third write data; and
 storing the third write data in the NVSM cache while reading the first write data from the valid data sectors.

21. The method as recited in claim 20, further comprising flushing the third write data together with the first and second write data to the data sectors at the head of the first circular buffer.

22. The method as recited in claim 18, wherein logical block addresses (LBAs) are associated with the first and second write data, and the method further comprises flushing the first and second write data from the NVSM cache in an order based on the LBAs.

23. The method as recited in claim 22, further comprising flushing the first and second write data from the NVSM cache in a sequential order based on the LBAs.

24. The method as recited in claim 18, further comprising:
 defining a second circular buffer comprising a plurality of the tracks; and
 flushing the first write data from the NVSM cache to the first circular buffer and flushing the second write data from the NVSM cache to the second circular buffer.

25. The method as recited in claim 18, wherein logical block addresses (LBAs) are associated with the first and second write data, and the method further comprises:
 defining a second circular buffer comprising a plurality of the tracks; and
 flushing the first and second write data from the NVSM cache to the first circular buffer and to the second circular buffer based on the LBAs.

26. The method as recited in claim 25, further comprising:
 assigning a first LBA range to the first circular buffer and assigning a second LBA range to the second circular buffer; and
 flushing the first and second write data from the NVSM cache to the first circular buffer and to the second circular buffer based on the LBAs of the write data and the corresponding LBA ranges of the circular buffers.

27. The method as recited in claim 26, further comprising:
 assigning a third LBA range in the NVSM cache and a fourth LBA range in the NVSM cache; and
 storing the first write data and the second write data in the NVSM cache based on the LBAs of the write data and the corresponding LBA ranges of the NVSM cache.

28. The method as recited in claim 27, wherein the first LBA range equals the third LBA range and the second LBA range equals the fourth LBA range.

29. The method as recited in claim 16, wherein the non-volatile cache comprises a disk cache comprising a plurality of the tracks on the disk.

30. The method as recited in claim 29, further comprising:
- interrupting the reading of the first write data from the previously written valid data sectors in response to a write command received from a host;
- seeking the head to the disk cache; and
- storing the first write data and second write data received from the host in the disk cache.

\* \* \* \* \*